Patented Dec. 29, 1931

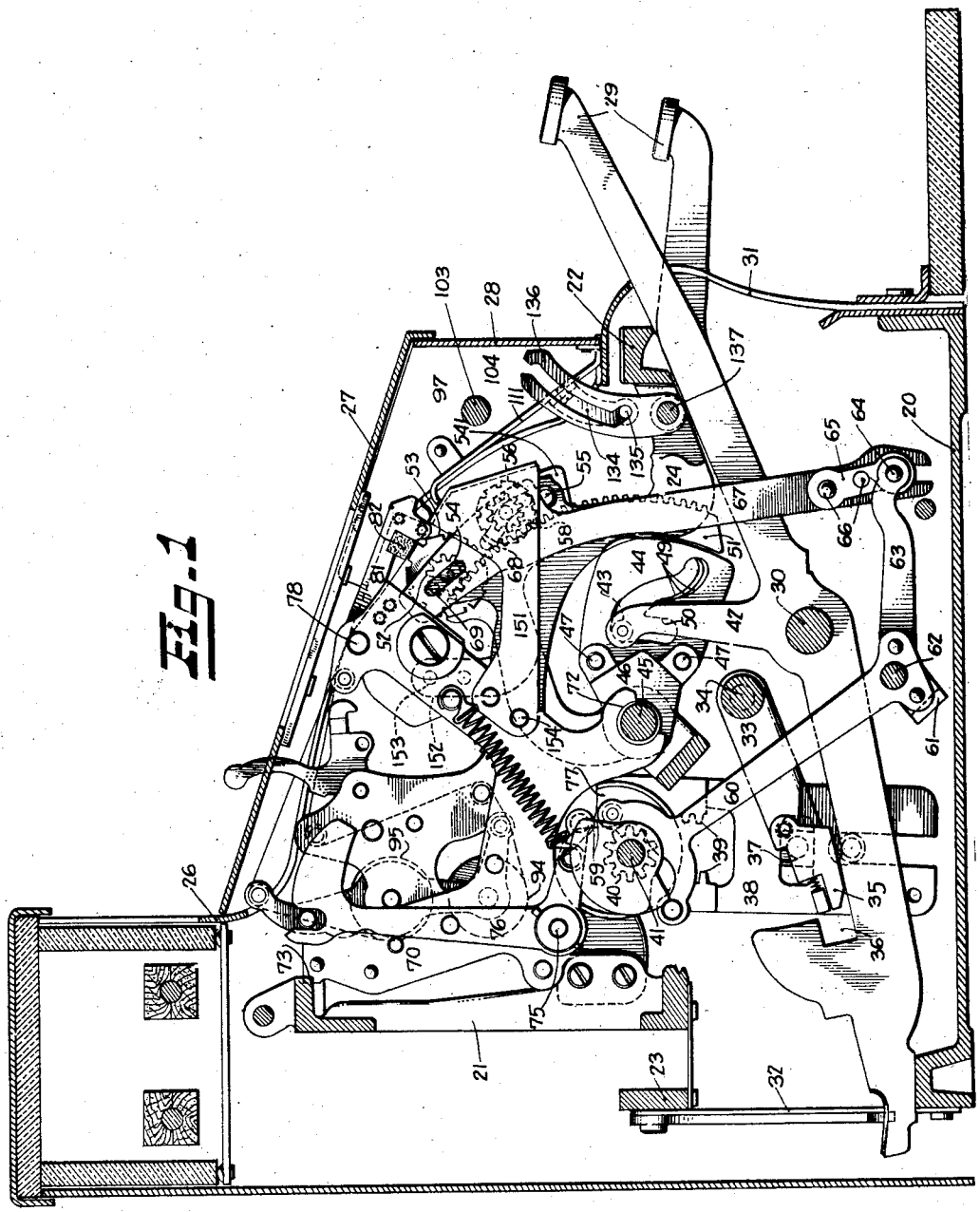

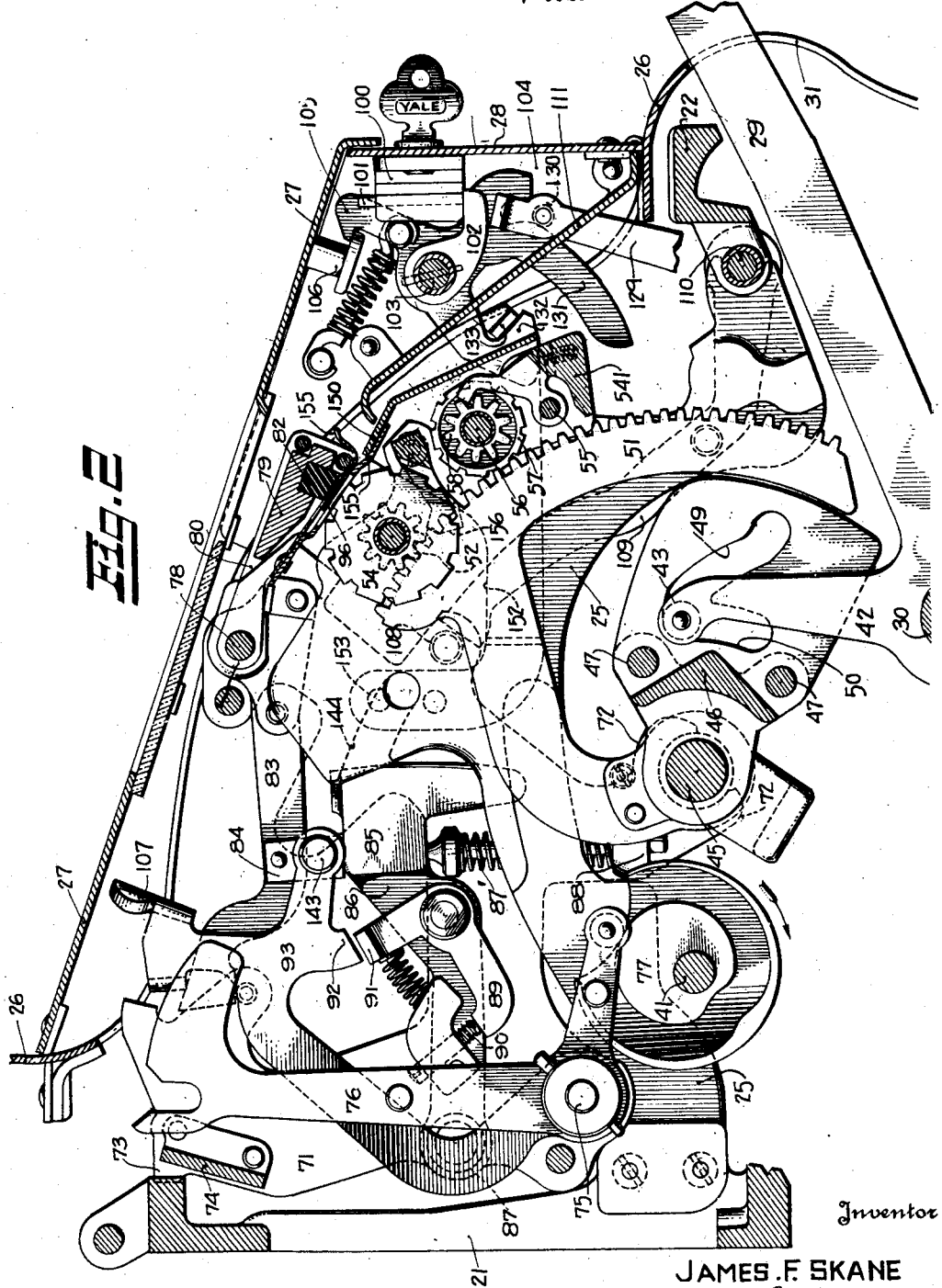

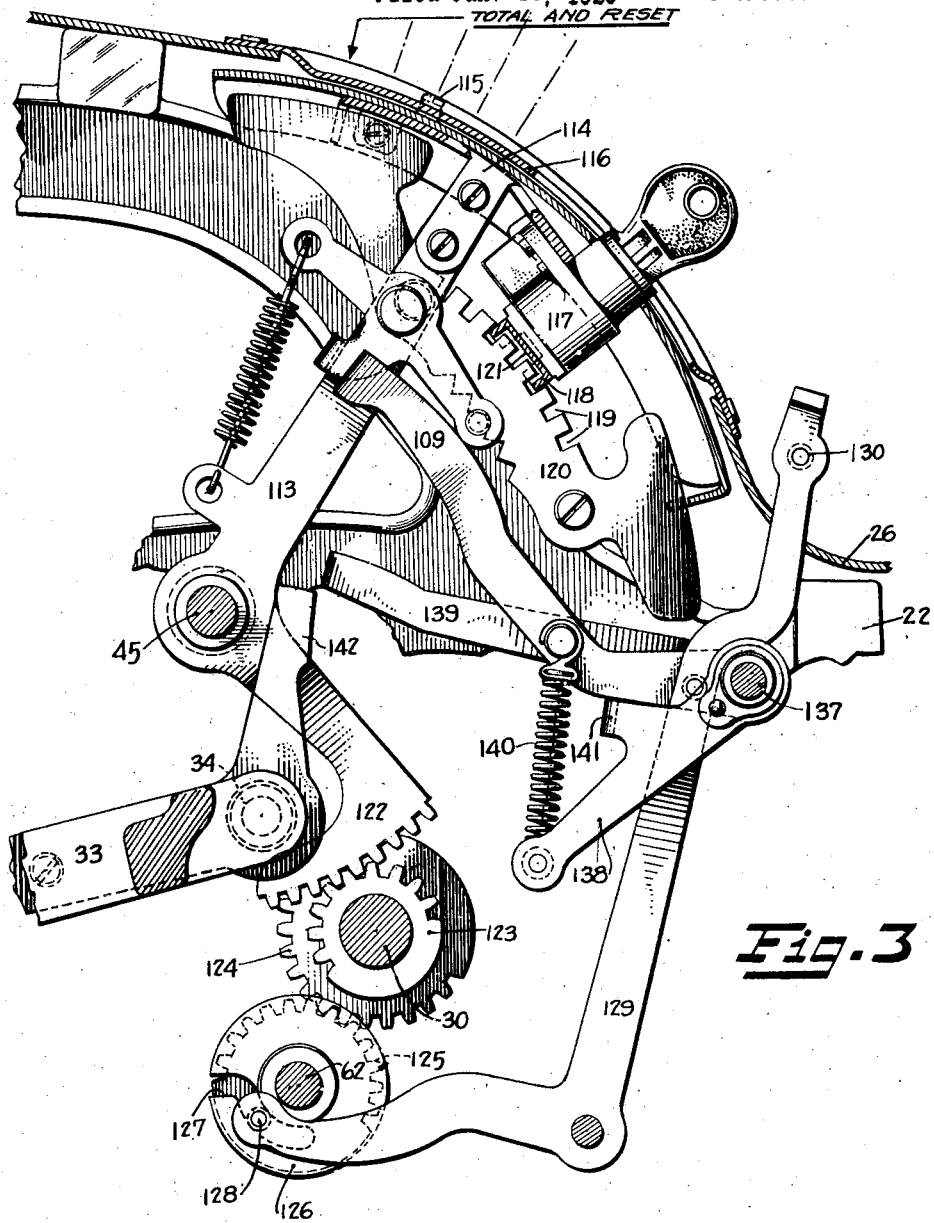

1,839,179

UNITED STATES PATENT OFFICE

JAMES F. SKANE, OF ILION, NEW YORK, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed January 10, 1925. Serial No. 1,585.

This invention relates to cash registers and accounting machines generally and more particularly to that class employing printing devices for printing accumulated items and totals.

One object of the present invention is to provide a printing totalizer adapted to print the total of a series of items upon the record strip associated with interlocking devices so as to insure a correct printing of the total.

The present register has been designed particularly for use in chain stores, department stores, or the like, where the supervision of a number of registers is controlled by some person generally known as the auditor. Printing of the total is placed under the control of authorized persons and while they can obtain this information it is essential, of course, that they do not take advantage of this and operate the machine fraudulently, thereby rendering an amount which is actually less than the machine has registered.

In some registers on the market it is possible for a dishonest person to manually rotate the totalizer elements backwardly any desired amount and produce an erroneous record of the total. To preclude this possibility the present register has a shield or guard securely fastened to the printer frame so that access to the total printing elements cannot be obtained, even though the lids of the register are open as when the machine is conditioned for a total printing operation.

Another object of the present invention is to combine this shield or guard with interlocking devices between the operating keys and the total taking means so that the proper operation of these devices will be insured, and any irregular operations which would result in the printing of an incorrect total are prevented.

With these and incidental objects in view the invention consists of certain novel features of construction and combination of parts, the essential elements of which are set forth in the appended claims and a preferred form of embodiment is hereinafter described with reference to the drawings that accompany and form part of the specification.

Of said drawings:—

Fig. 1 is a sectional view of the cash register taken near the left end of the machine showing some of the keys, the printing devices, the differential mechanism for driving the totalizer elements, the totalizer engaging mechanism and the driving means for the main operating shaft.

Fig. 2 is a transverse sectional view looking toward the right and taken substantially through the center of the machine showing among other features the lid locking devices, the printing devices for printing items and totals, and the guard which effectively prevents any manual rotation of the totalizer elements, the printer operating cam and arm are also shown for the sake of better illustration although these parts are actually in a plane to the left of the section on which this view is taken.

Fig. 3 is a transverse sectional view showing the general control lever and the lock for holding it in its variously adjusted positions. This view also shows the interlocking devices between the total printing means and the operating keys.

Reference to the detailed description which follows which is divided under suitable headings, will give a full understanding of the various features embodied in the present invention and their intended mode of operation.

For the purpose of illustration this invention has been shown as applied to a type of machine the general principles of which are disclosed in the U. S. application, Ser. No. 263,125 filed Nov. 19, 1918, by Frederick L. Fuller as well as the British Patents #135,465—157,823,—157,824,—157,825 granted for the same invention, but it is to be understood that this invention is not limited to this type of machine, but may with slight modification be applied to other well known forms of accounting machines. The aforementioned U. S. application matured into Patent 1,742,701 on January 7, 1930.

Framework

The various parts of the mechanism are supported by a suitable frame work comprising a base casting 20 and suitable side frames, one of which is shown in Fig. 3 of the present drawings. The main side frames are connected at their upper rear ends by a frame work 21 and cross connections in the form of tie bars 22 and 23 situated toward the front and rear of the machine respectively. The present machine is also provided with two intermediate and parallel supporting frames 24 and 25. The mechanism is enclosed by a cabinet 26 preferably formed of one piece and of any suitable material. The cabinet 26 has hinged thereto a flat lid 27 and a front cover 28 which are provided to obtain access to the printing mechanism for replenishing the paper supply, printing totals, and resetting the totalizer, etc.

Keys and operating mechanism

The illustrative machine is provided with a number of groups of amount keys several of these being shown in Fig. 1 and indicated by reference character 29.

The amount keys 29 are pivoted upon a shaft 30 extending transversely of the machine and journalled between the side frames. The keys are guided in their reciprocating movements by slots 31 formed in the front part of the cabinet 26 and are further guided at their rearward ends by a vertically slotted plate 32 attached to the tie bar 23. Resting upon the rear ends of the keys is a key coupler 33 journalled at 34 between the side frames. The key coupler has a nose 35 cooperating at times with notches 36 formed in the rear ends of the keys 29. When the outer ends of the keys are depressed the key coupler 33 is rocked clockwise and the nose 35 thereon enters the notches 36 formed in the rear ends of the keys. The purpose of such key coupler mechanism is well known in the art and need not be discussed herein.

Connected to the key coupler at 37 is a vertically reciprocating rack plate 38 provided with oppositely facing rack teeth 39 which alternately mesh with a gear 40 fast to a main operating shaft 41 journalled between the machine side frames. The arrangement of this mechanism is such that a reciprocation of the key coupler 33 by the keys will effect a complete rotation of the gear and the shaft 41 to which the gear is secured. Shaft 41 is provided with cams or other suitable devices for operating the various parts of the register and printing mechanisms.

Differential mechanism

The differential mechanisms or devices controlled by the various groups of keys for adjusting the item type carriers and actuating the totalizer elements are all similar in construction and principle and a description of one will suffice for all. As shown in Fig. 1 each of the amount keys 29 is provided with an upwardly extending arm 42 carrying a suitable anti-friction roller 43 co-operating with differential slots formed in cam plates 44. Loosely mounted upon the transverse shaft 45 is a frame 46 provided with spaced slots in which are secured by pins 47 a series of cam plates one for each key. The cam plates 44 are provided with L shaped slots 49 and 50, the slots 50 being concentric with respect to the shaft 45. The slots 49 are, however, graduated so that when the roller 43 carried by the arm 42 of a depressed key operates in a slot 49 in its associated cam plate 44 it will move the frame 46 differentially and to an amount commensurate with the value of the key depressed. When, however, the frame 46 is operated by the depression of a key 29 of a certain group, the rollers 43 of the undepressed keys of the same group will play in the arcuate slots 50 of their respective cam plates 44 thereby permitting the frame 46 to be raised differentially without interfering with the rollers 43 of the unoperated keys.

It is to be understood that there is a differential frame for each group of amount keys and as is shown in the drawings each differential frame 46 has attached thereto a segmental rack 51. In continuous mesh with the teeth of the segmental rack 51 is a pinion 52 attached to an item type wheel 53 mounted upon a shaft 54 journalled between the intermediate parallel supporting frames 24 and 25. From the above it will be evident since there may be nine keys in a particular group and a corresponding number of cam plates 44, the type carrier 53 may be brought to any one of nine different positions by the selective depression of keys 29 associated with such groups. In a manner similar to this the keys associated with any of the other denominational groups will adjust their related type carriers so that when printing is effected the type wheel will print a character upon the record strip corresponding to the value of the key depressed.

Totalizer and engaging mechanism

Situated below the type carriers 53 is a pivotally mounted totalizer 541. The totalizer 541 is pivotally journalled at 55 (Fig. 1) between the side frames 24 and 25 and comprises a frame having mounted therein a shaft 56 supporting a series of wheels 57, the peripheries of which are formed with raised characters so as to effect printing upon a suitable impression material. Each printing wheel 57 has attached thereto a pinion 58 which is adapted to mesh at the desired time with the teeth of the actuating racks 51. For engaging the totalizer with the segmental racks 51 any suitable means may be employed, but as herein disclosed it comprises a pair of complementary cams 59 (Fig. 1), the peripheries of which are adapted to co-operate with rollers carried by a lever 60 secured to a bail 61 loosely pivoted upon a shaft 62 near the base of the machine. The bail 61 has attached thereto at substantially the center of the machine a lever 63 engaging a pin 64 carried by a plate 65. Plate 65 is riveted at 66 to a totalizer control slide 67 provided with a cam slot 68 in engagement with the totalizer element supporting shaft 56 previously referred to. The totalizer control slide 67 is furthermore provided with a closed slot 69 engaging the item type carrier supporting shaft 54.

From the above it will be clear that when the machine is operated the complementary cams 59 will rock the lever 60 clockwise and through the medium of the bail 61, lever 63 and the pin and plate connection to the control slide 67, will move the latter and due to the action of the cam slot 68 upon the totalizer shaft 56 the totalizer pinions 58 will be forced into mesh with the actuating racks. During the downward depression of the keys the totalizer pinions will remain in mesh with the actuating racks being at this time actuated an amount corresponding to the value of the key depressed. Upon the completion of the downward stroke of the keys or at the beginning of the upward stroke, if desired, the control slide 67 is raised upwardly by the mechanism just described and the totalizer elements will be thrown out of mesh with the actuators and retained in that position.

*Record strip printing mechanism*

It is desirable that each time an item is entered in the machine that the amount be printed upon the record strip within the machine cabinet. The record strip gives a complete record of all the transactions entered in the machine, and at the end of a particular period it may be detached from the supply roll, and filed away for future reference.

The printing mechanism for printing the items and totals accumulated by the totalizer comprises a pivoted printing frame formed of two side frames 70 and 71, the lower ends of which are provided with claws 72 overlying the shaft 45. Normally the printing mechanism rests by its own weight in the position shown with lugs 73 contacting with a portion of the frame 21. The frames 70 and 71 are connected together by a cross member 74 and shafts and other members which will be referred to hereinafter. In its normal position the printer frame is adapted to print the items entered in the machine, but it may be rocked downwardly under the control of a manipulative device to print the total upon the record strip from the totalizer wheels 57.

Journalled in the printer side frames 70 and 71 is a shaft 75, the extreme left end of which has fastened to it a bell-crank 76 carrying a roller which co-acts with the race of a box cam 77 fast to the shaft 41. As has been mentioned hereinbefore the shaft 41 is given a complete rotation during each operation of the machine and the rotation of the box cam will rock the shaft 75 to actuate a platen and to feed the record strip and inking ribbon. Extending transversely of the printer side frames 70 and 71 is a platen supporting shaft 78 upon which is supported the platen 79 by means of a pair of parallel supporting arms 80 and 81. The under face of the platen 79 is provided with a rubber impression block 82.

Extending rearwardly from and movable with the right arm 80 (Fig. 2) is a platen actuating arm 83 provided with a lug 84 which is actuated by a spring-pressed hammer 85 to force the platen block 82 against the adjusted type to take an impression. For actuating the platen actuating arm 83 of the platen 79 any suitable means may be provided and one form which this mechanism might take comprises the hammer 85 which is formed as part of a lever 86 pivoted to the inside of the right printer side frame 71 by a stud 87. The hammer 85 is forced upwardly by a spring 87' bearing at one end against a lug 88 integral with the printer frame 71. The arm 86 is furthermore provided with a spring-pressed retracting pawl 89 having a tail bearing against an adjustable stop 90 on the arm 86. The pawl 89 has a lug 91 cooperating with a nose 92 formed as part of an arm 93 secured to the main printer shaft 75.

When the arm 93 is rocked clockwise by means of the bell-crank 76 and shaft 75 to which it is secured, the nose 92 on the arm 93 will bear against the lug 91 of the pawl 89 and retract the hammer 85 against the tension of the spring 87'. Upon a further movement of the arm 93 the nose 92 will clear the lug of the pawl 89 and under the influence of the compressed spring 87' will permit the hammer portion 85 to strike the lug 84 and through the platen actuating arm 83 and supporting arms 80 and 81 will rock the platen 79 downwardly to effect a printing impression from the adjusted type carriers.

The record strip upon which are printed the items and totals is shown diagrammatically in Fig. 1 the paper extending from the supply roll 94 around suitable guide rolls, around the platen 79, around other guide rolls and finally back to the storage roll 95. The details of the record strip as well as the means for advancing it during the regular operation of the machine forms no part of the present invention and one form which this device might take is fully set forth in the aforementioned Fuller application, Ser. No. 263,125 as well as the British patents cited and therefore need not be described here.

The machine is further equipped with an inking ribbon 96 and an associated ribbon feeding mechanism which is not shown in the drawings since it does not comprise any part of the present invention. It is sufficient here to state that the inking ribbon 96 passes between the record strip, below the platen block 82, and the type wheels 53 and is carried by a pair of supporting plates 155 carried by the platen supporting shaft 78. One form which the ribbon feeding mechanism might take is clearly shown and described in the Fuller application, Ser. No. 263,125 and the British patents mentioned to which reference may be had for further details of construction and operation.

Lid construction

The lids 27 and 28 which are hinged to the cabinet 26 are provided to cover and conceal the record strip printing mechanism and the printing totalizer. The lid 27 may be provided for the purpose of permitting the clerk to obtain access to the paper holding mechanism in order to replenish the supply of paper when it is exhausted. The cover 28 is provided to conceal and cover the printing totalizer and prevent unauthorized access to the resetting devices for the totalizer elements. Separate locks may preferably be provided for the upper lid 27 and front cover 28 so that while the clerk may have access to the printing mechanism for replenishing the paper supply when necessary he cannot obtain access to the totalized resetting devices or print the totals from the printing totalizers thereby obtaining information which he is not entitled to.

In other cases certain persons are authorized to obtain such information and it is essential of course that they do not take advantage of this fact and operate the machine fraudulently thereby rendering an accounting of money which is actually less than the machine has registered. To insure that the accounting is always correct the present invention contemplates the use of locking devices and guards which permit the operation of the devices in the proper manner, but prevent any mis-operations of the mechanisms.

The manner by which the clerk can obtain access to the printing mechanism to replenish the paper supply will now be described.

As shown in Fig. 2 the front cover 28 has secured to it by any suitable fastening means a lock 100, the bolt 101 of which is adapted to co-operate with an arm 102 secured to a shaft 103 passing between the side plates 104 forming part of the cover 28. Secured to the shaft 103 is a hook 105 co-operating with the flange of a stud 106 riveted to the lid 27. From the above it will be evident that when the clerk desires to open the lid 27 all that is necessary is to operate the key in the lock 100 to disengage the hook 105 from the flange of the stud 106.

Opening of the upper lid would normally give access to the totalizer elements if preventive means were not provided, but to preclude the possibility of the insertion of an instrument to rotate the wheels the cover 28 has riveted thereto a transverse plate 111 extending between the side plates 104. The plate 111 is suitably apertured to receive the various members which must project through it but the plate 111 effectively conceals and covers the totalizer elements at all places.

Total printing

It will be noted that the total printing lever 107 is located under the lid 27 and since it is not desirable to permit the clerk to operate the lever to obtain a printed total this lever is normally locked and is released by means of a supplemental lock which will be hereinafter described.

When the total printing lever 107 is operated it is adapted to rotate the printing unit about the shaft 45 as a center until the platen 82 is directly over the totalizer printing elements. In order to normally prevent this operation the printer side plate 71 has secured thereto a stud 108 (Fig. 2) normally co-operating with the rearward edge of a locking arm 109 rigidly secured to a shaft 110.

The lock which permits the adjustment of certain mechanism so as to condition the machine for a total printing operation will now be described, reference being made particularly to Fig. 3.

Loosely mounted upon the segment shaft 45 is a control lever 113 having secured thereto by any suitable means a concentric plate 114 slidable beneath the cabinet 26. The plate 114 carries a pointer 115 which is slidable in a slot formed in a second concentric index plate 116 attached to the machine cabinet. Attached to the plate 114 by any suitable means is a lock 117 which projects through a slot in the index plate 116 and has at its lower end a flanged bolt 118 which engages suitable notches 119 in a plate 120 carried by the right side frame. The flange 118 is provided with a slot 121 which is adapted to be brought into the plane of the plate 120 by the rotation of the barrel of the lock.

To adjust the control lever to the uppermost position designated as "Total and Reset" all that is necessary is to insert the key in the lock and rotate the barrel to bring the slot 121 in the plane of the plate 120 and then move the lock and the control lever so that the index 115 points to the desired designation. The key is then given a 90° turn in the reverse direction so that the flange co-operates with the desired notches 119. Removal of the key will now lock the control lever in its adjusted position. Adjustment of the control lever to the position just stated will simultaneously unlock the lid 27 and the cover 28. It will also permit the operation of certain interlocks between the total printing lever and the operating keys so that they are effective as long as the machine is conditioned to allow total printing. The mechanism for unlocking the lid 27 and the cover 28 simultaneously will now be described.

The lever 113 is provided with a gear sector 122 meshing with a gear sector 123 secured to the key shaft 30. Also secured to this shaft is a somewhat larger gear sector 124 meshing with another sector 125 rigidly secured to the transverse shaft 62 previously mentioned. The shaft 62 also carries a disk 126 formed with a cam slot 127 co-operating with a stud 128 carried by the rearward arm of a bell-crank 129. Referring to Fig. 2 it will be noted that the upper end of the bell-crank 129 carries a pin 130 co-operating with a downward extension 131 integral with the hook 105 previously referred to. Also integral with the hook 105 and the extension 131 is a hook 132 co-operating with a lug 133 integral with the cabinet 26. It will be noted that when the lock 100 is operated to release the lid 27 the hook 105 will be rocked sufficiently to unlock the upper lid, but not enough to disengage the hook 132 from the lug 133 to unlock the front cover 28. When, however, the control lever is moved to the "Total and Reset" position the shaft 62 is rocked counter-clockwise (as viewed in Fig. 3) thereby forcing the pin 130 rearwardly a sufficient distance to rock the shaft 103 for disengaging both hooks from their associated locking members.

As suggested heretofore, the printer frame and the total printing lever are normally locked against movement but are unlocked whenever the front cover 28 is opened. As best shown in Fig. 1 there is integral with the transverse plate 111 of the front cover a downwardly extending arm 134 carrying a pin 135 co-operating with a cam slot formed in a plate 136 attached to a transverse shaft 137. As shown in Fig. 3 the transverse shaft 137 is provided with a rearwardly extending arm 138. Shaft 137 is in direct alinement with the shaft 110 previously referred to and which has secured to it a locking arm 139 in addition to the printer locking arm 109 mentioned heretofore. A spring 140 extending between the arms 109 and 138 forces the arm 109 down against a lug 141 on the arm 138. This permits the arms 109, 138 and 139 to normally move as a unit whenever the shaft 137 is rocked rearwardly by means of the arm 134 shown in Fig. 1. It is obvious that when the front cover 28 is swung outwardly the shaft 137 will be rocked counter-clockwise as viewed in Fig. 3, while spring 140 will serve to force the rear end of the arm 109 out of the path of the pin 108 carried by the printer frame. At the same time the arm 139 will drop in front of an arm 142 movable with the key coupler 33. This will lock the key coupler and the amount keys against operation and by these provisions it will be impossible to take a total and simultaneously operate the registering keys.

Since the machine is now in the condition for printing a total upon the record strip all that is necessary is to operate the total printing lever 107, which will cause total printing in the manner which will now be described. The total printing lever 107 has secured thereto a stud 143 which co-operates with a groove 144 formed in the right hand supporting frame 25. As shown in the drawings the total printing lever 107 is an integral part of the arm 93 which, it will be remembered, is rocked about its pivot 75 each time an item printing operation is performed. To take a total the lever 107 is grasped and by drawing it forward and rocking the printer unit about the shaft 45 the stud 143 will enter the groove 144 and cause a clockwise rotation of the shaft 75 to the same extent that the box cam rocks it during a regular item entering operation. The cam groove 144 is so proportioned and curved that it will cause the release of the printing hammer 85 at substantially the time that the platen 79 overlies the total printing elements, the end of the groove 144 serving to stop the forward movement of the printer frame when it is in its proper position to print a total from the totalizer. Whenever a total is printed the record strip will be fed an increment so as to suitably space the printed total from the last printed item. Suitable means for performing this function has been disclosed in the Fuller application and the British patents already mentioned.

*Totalizer shield*

It is quite evident that in order to print a total it would be necessary if no special guard were provided, to expose to a certain extent the printing elements of the totalizer 541 whenever the platen is in a condition to be rocked to obtain an imprint from the totalizer. It will be noted that if no other provision were made, whenever the front cover 28 is opened the totalizer elements would be exposed and the wheels might by some instrument be adjusted to any position desired so as to print an incorrect total. In order to guard against any such fraudulent operation the present application utilizes another plate or shield in addition to the transverse plate 111 previously mentioned and it is so designed, arranged and constructed that it will not only normally prevent improper adjustments of the totalizer wheels but will effectively prevent such operation during the time that the printing unit is being adjusted to obtain a total imprint. This means will now be described in detail.

A shield 150 is situated to the rear of the transverse plate 111 and extends transversely over the totalizer frame 541 which, it will be remembered, is carried by the intermediate support frames 24 and 25. Integral with the shield 150 and situated outside of the support frames 24 and 25 are side plates 151 and 152. The plate 152 (Fig. 2) is suitably bent and riveted at 153 to the printer side plate 71 while the plate 151 is riveted at 154 to the printer side plate 70. Thus it will be seen that the shield 150 is carried by the printer and each time the printer is moved the shield receives a corresponding movement.

It will be noted that the shield 150 may be arranged in close proximity to the forward edge of the totalizer frame rendering it very difficult if not altogether impossible to insert an instrument to manipulate the totalizer elements. As shown in Fig. 2 the lower ribbon supporting plate 155 extends forwardly and under the shield and this effectively closes any gap between the shield and the impression frame 79. Even if it were possible to effect the entrance of an instrument at this place it would be difficult to force it far enough to reach the totalizer wheels in view of the fact that the detail type aligning devices 156 occupy a large portion of this space.

When the printer is moved downwardly under the control of the total printing lever 107 as premised hereinbefore, the platen 79 will move simultaneously with the shield 150 thus always preserving the normal relationship between these elements. From the above it will be evident that by these important provisions it will be impossible to turn the totalizer elements even if the cabinet is removed from the machine, except of course, by the ordinary operations of the machine which will leave its traces upon the record strip.

While the form of mechanism herein shown and described is admirably adapted to fulfill the objects primarily stated it is to be understood that it is the desire not to confine the invention to the one form of embodiment shown and described, as it is susceptible of embodiment in various forms, all coming within the scope of the claims which follow:

What is claimed is:

1. In a cash register, the combination with a printing totalizer comprising a plurality of printing elements, a movable printing frame for effecting printing impressions from the totalizer elements, and a guard integral with the printer frame for shielding the totalizer elements.

2. In a machine of the class described a series of item printing elements, a series of elements for printing totals of items printed by said item printing elements, a printing frame normally in position for printing items but movable to a position for printing totals, an impression member carried by said printer frame and adapted to conceal said total printing elements when said frame is in total printing position, and a guard carried by said frame for concealing said total printing elements when said frame is in item printing position.

3. In a machine of the class described, a series of total printing elements, a printing frame movable from a normal position to a position for effecting printing from said elements, an impression member carried by said frame and adapted to conceal said total printing elements when said frame is in total printing position, and a guard carried by said frame and arranged closely adjacent said impression member for normally shielding and concealing said total printing elements.

4. In a machine of the class described, the combination with a series of total printing elements, means for effecting printing impressions from said elements, means integral with said printing means for concealing said elements, and means connected to said printing means for concealing said elements when the first mentioned concealing means is ineffective.

5. In a cash register, the combination with a printing totalizer, a movable printing mechanism for taking printing impressions from said totalizer, a lid concealing said totalizer, means for releasing said lid, means controlled by said lid normally preventing movement of the printing mechanism, and a guard carried by the printing mechanism for concealing the totalizer when the lid is opened.

6. In a cash register, the combination of a printing totalizer comprising a plurality of printing elements, an adjustable platen normally out of printing relationship with said totalizer, means for moving the platen to print from said totalizer, and a guard carried by said means for normally shielding the totalizer elements.

7. In a cash register, the combination with a printing totalizer, a printing mechanism for taking printing impressions from the totalizer, a cabinet, a lid hinged thereto, a control lever for controlling the operation of the printing mechanism and said lid, and a guard carried by the printing mechanism and located under the lid so arranged as to conceal the printing elements when said lid is opened.

In witness whereof I have signed my name hereto this 7th day of January, 1925.

JAMES F. SKANE.